Nov. 27, 1962  O. F. ECKLUND ET AL  3,066,063
METHOD OF FORMING LONGITUDINALLY EXTENDING
SIDE SEAMS IN A TUBULAR CONTAINER
Filed Oct. 17, 1957  2 Sheets-Sheet 1
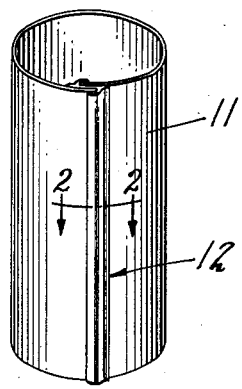
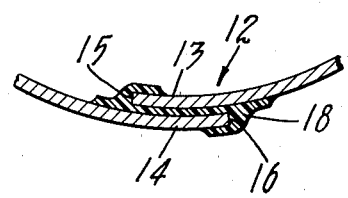
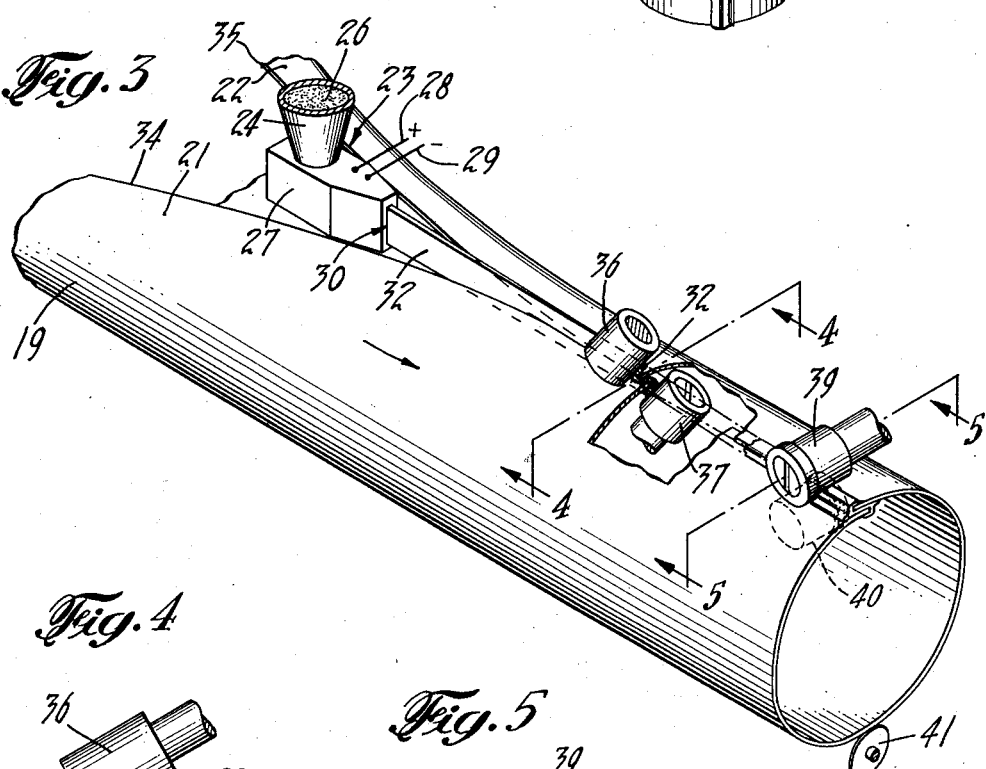
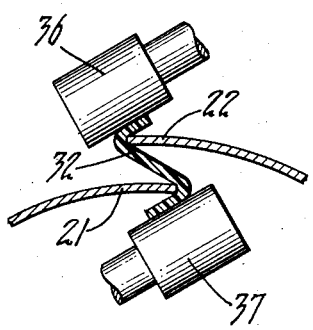
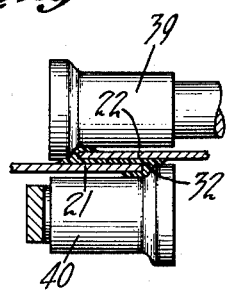
INVENTORS
OSCAR F. ECKLUND
ROBERT W. PILCHER
BY Charles H. Lune
Leland R. McCann
George W. Reiber
ATTORNEYS

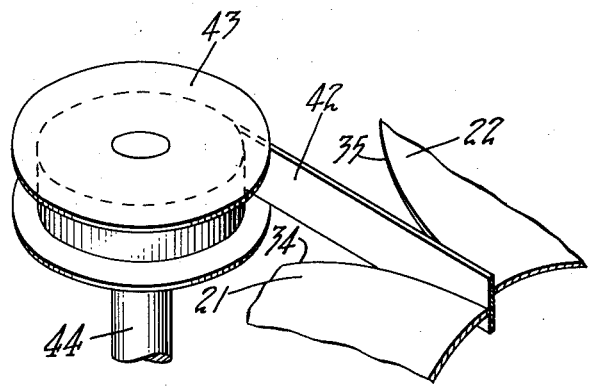
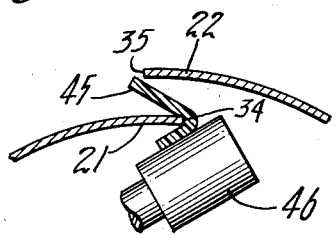
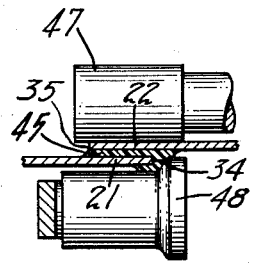
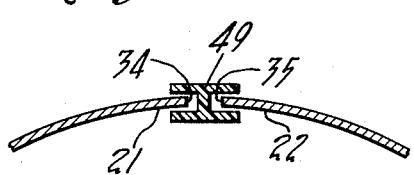
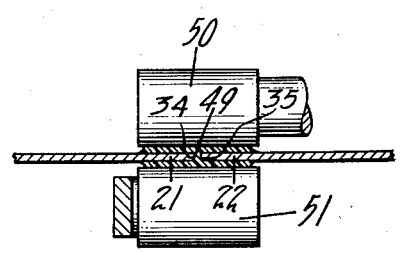

United States Patent Office 3,066,063
Patented Nov. 27, 1962

3,066,063
METHOD OF FORMING LONGITUDINALLY
EXTENDING SIDE SEAMS IN A TUBULAR
CONTAINER
Oscar F. Ecklund and Robert W. Pilcher, Barrington, Ill., assignors to American Can Company, New York, N.Y., a corporation of New Jersey
Filed Oct. 17, 1957, Ser. No. 690,831
8 Claims. (Cl. 156—200)

The present invention pertains to a method of forming a side seam for a tubular container body and the article produced by this method. More particularly, the invention pertains to the method of joining the marginal edges of a sheet or web to form the longitudinally extending side seam of a tubular container body and the container body thus produced.

In the formation of a longitudinal side seam for a container body, it is necessary to provide some sort of means to join or secure together the longitudinal margins. To satisfy present day high speed commercial operations, it is desirable that the provision of the necessary joining means be done rapidly and continuously.

Further, in the formation of a lap side seam, the overlapped margins usually terminate in a raw edge. The inner and/or outer surface of the container body may be readily protected against various forms of attack such as by moisture or other destructive agents by the application over these surfaces of some sort of protective coating such as a plastic or metal lining. However, it is exceedingly difficult to protectively and adequately cover the raw edges present in the side seam by means heretofore known to the prior art.

It is, therefore, an object of the instant invention to provide a method of rapidly and continuously supplying the joining means necessary to secure together the longitudinal margins to form a lap or butt side seam for a container.

It is a further object to provide a method of quickly and efficiently covering the raw edges in a lap side seam which obviates the vulnerability of these edges to destructive attack.

Another object is to provide a method of forming a longitudinally extending lap side seam wherein the joining means necessary to secure together the longitudinal margins and a protective covering for any raw edges are supplied simultaneously.

Still a further object is to provide a method of the character described which is quick and efficient and lends itself to high speed operation.

Still another object is to provide a container body having a novel side seam construction.

Numerous other objects and advantages of the invention will be apparent as it is better understood from the following description, which, taken in connection with the accompanying drawings, discloses a preferred embodiment thereof.

The above and other objects are accomplished by continuously forming a web or sheet into substantially tubular configuration with its longitudinally extending margins in juxtaposed, spaced relation, moving the tube thus formed in a longitudinal direction while bringing the edges of said margins towards each other, feeding a tape or ribbon of flexible, coherent side-seam-joining material into the path of travel of the moving margins and between the approaching edges thereof, contacting the ribbon with at least one of the marginal edges, forcing the margins into intimate, contiguous relation, and securing the ribbon to the thus positioned margins to join said margins and to cover either or both of their edges.

The term tubular as used herein is meant to denote an elliptical, rectangular or polygonal cross sectional shape as well as circular. The material composing the web or sheet from which the container body is formed may be fibre, i.e. paper, fibre having a liquid and/or vapor proof coating thereover such as a plastic coating; a plastic such as polyethylene, or thin gage metal such as aluminum or conventional tin can body stock.

The side seam joining ribbon may be composed of: fibre coated with a suitable adhesive; thin gage, readily deformable metal such as aluminum; or a synthetic resin. If a synthetic resin is used, it may be either a thermosetting material or a thermoplastic material such as polyethylene. Thermoplastic materials are preferred. It is necessary that the material composing the ribbon be flexible so that it can be readily bent or shaped into one of the configurations mentioned hereinafter; and that it be coherent or have a reasonably high tensile strength so that it will remain continuous and not pull apart during the feeding and joining operations.

The ribbon may be either preformed and fed to the web as a solid material of extended length such as from a reel or spool; or it may be continuously extruded in the form of a semi-molten material. Any flexible, coherent ribbon may be fed as a preformed solid. However, for practical reasons, the extrusion technique is limited to use with a thermoplastic resin material.

The ribbon may be fed to the moving web or sheet in a wide variety of shapes depending upon the final structure desired. A preformed, solid ribbon is most practically fed flat and thereafter bent or shaped into the desired configuration by some mechanical device such as guides or a die. An extruded semi-molten plastic can be fed flat; or can be extruded directly in the desired shape merely by providing an extrusion die having an extrusion orifice with the particular shape desired.

Since the principal objects of the present invention are to join the longitudinal margins of the sheet or web and to protect or at least cover either or both of the edges of the margins, the ribbon must be so shaped as to at least hold the margins in contiguous relation and extend around at least one edge. The simplest shape by which this can be accomplished is a so-called V-shape wherein one leg of the V is disposed between the margins, the apex covers one edge and the other leg, usually shorter, covers a portion, usually the inside, of the finished seam. To cover both edges as well as extending between the margins, an S- or Z-shape may be used.

The above-mentioned shapes are used in the formation of a lap side seam. If it is desired to form a butt side seam, the ribbon can be formed to have a T- or I-shape whereby the marginal edges abut each side of the central web of the T or I. The outer flange or flanges are attached to the inner and/or outer surfaces of the seam and secure the margins in contiguous relation. It is to be understood that the above-mentioned shapes, i.e. V-, S-, etc., may be lying on their sides or at some other position depending upon the position of the longitudinal margins. The designations V, S, etc. are meant to include all such positions.

Referring to the drawings:

FIGURE 1 is an elevational view in perspective of a can body having a side seam formed according to the method of the present invention;

FIG. 2 is an enlarged sectional view of the side seam taken substantially along line 2—2 of FIG. 1, with parts broken away;

FIG. 3 is a schematic view in perspective illustrating the method of the present invention;

FIG. 4 is an enlarged sectional view taken substantially along line 4—4 of FIG. 3, with parts broken away;

FIG. 5 is an enlarged sectional view taken substantially along line 5—5 of FIG. 3, with parts broken away;

FIG. 6 is a perspective view, partially in section, of a modified form of ribbon feeding mechanism; and FIGS. 7 to 10 inclusive are enlarged sectional views similar to FIGS. 4 and 5, but showing various configurations of the ribbon.

As a preferred or exemplary embodiment of the instant invention, FIG. 1 illustrates a fibre can body 11 having a longitudinally extending lap side seam generally designated 12. Lap side seam 12 is composed of the overlapped or superposed longitudinally extending margins 13 and 14 terminating at their longitudinal edges in a raw edge 15, 16 respectively (FIG. 2). A solidified film of thermoplastic material 18 extends from the inside of the body 11 adjacent edge 15 around and over the edge 15, thence between the overlapped margins 13, 14 and around edge 16 terminating on the outside of the body 11 adjacent edge 16. By virtue of the fact that the thermoplastic material 18 adheres firmly to the surface of body 11, the continuous thermoplastic film 18 covers and protects the raw edges 15, 16 and at the same time provides the adhesive bond between the overlapped margins 13 and 14.

Referring to the method of the instant invention as shown in FIG. 3, a sheet or web 19 is fed in a longitudinal direction and brought into tubular configuration by any suitable means (not shown). Fixedly supported substantially in the path of travel of the longitudinal margins 21, 22 of the web 19 is an extruding device generally designated 23.

The extruding device 23 comprises a hopper 24 containing pulverized solid particles of thermoplastic resin 26 which are fed by gravity into an extrusion die 27 heated by any suitable means such as an electric resistance heater, the energy to which is supplied by leads 28, 29. The forward end or the right end as viewed in FIG. 3 of die 27 contains a rectangular extrusion orifice 30 wherein the longer dimension of the rectangle is substantially vertical. In the operation of extruder 23, the powdered resin 26 fed to the die 27, is reduced to a semi-molten state and forced through die 30 to form a semi-molten ribbon 32 having a cross sectional configuration the same as orifice 30.

The ribbon 32 is extruded into the path of travel of the margins 21, 22. As these margins approach one another, suitable guides (not shown) position them in juxtaposed, spaced relation. As the margins 21, 22 further approach each other, the raw edge 34, 35 of each margin respectively is brought into contact with the side of the ribbon 32 adjacent thereto. As the web 19 continues its longitudinal travel, the margins 21, 22 are brought into superposed, spaced relation and the ribbon 32 of semi-solid plastic is formed into a substantial S-shape by means of rollers 36, 37 so that the ribbon 32 extends around each edge 34, 35 and between the margins 21, 22. The rollers 36, 37 must not cause excessive cooling and thereby premature solidification of the semi-molten plastic. This may be accomplished by any suitable means such as making the rollers of a non-heat conducting material, such as polytetrafluoroethylene known commercially as Teflon, or by maintaining the rollers at a desired elevated temperature by suitable controls (not shown). By means of metal rollers 39, 40, the margins 21, 22 are forced into intimate superposed relation, the S-shape of ribbon 32 is flattened and the semi-molten plastic is pressed into tight sealing or adhesive engagement with the fibrous material of the tube. Cooling of the semi-molten plastic to cause it to solidify may be accomplished in any suitable manner. In the exemplary embodiment illustrated, the metal pressure rollers 39, 40 have sufficient chilling effect to solidify the semi-molten plastic.

If the finished tube is formed from a continuous web of material as illustrated, it is thereafter severed into individual can bodies 11 by any suitable means such as a rotating cutter wheel 41. However, it is to be understood that the above described method can be used on individual body blanks by feeding the blanks in intimate end-to-end contact to form, in effect, after completion of the seam, a continuous tube. With such a construction, it is merely necessary to sever the thermoplastic resin connecting each body.

In the modified form of the invention shown in FIG. 6, a solid preformed adhesive coated ribbon 42 is fed from a spool or reel 43 rotatably mounted on a shaft 44 and supported by a suitable means (not shown). The edges 34, 35 of the margins 21, 22 respectively move toward one another and contact the adherent surface on each side of the ribbon 42 in the same manner as shown in FIG. 3. By virtue of its attachment to the margins 21, 22 and the movement of the latter, the ribbon 42 is pulled from the freely rotating spool 43 into the path of travel of the margins. If desired, the spool 43 can be driven by a suitable mechanism (not shown) so as to feed ribbon 42 in timed relation with the movement of the margins 21, 22.

In FIG. 7, a flat rectangular ribbon or tape 45 is bent into a substantially V-shape such as by a roller 46. Thereafter the opposed rollers 47, 48 roll the tape flat and into intimate and bonding engagement with the margins 21, 22 (FIG. 8). With such a configuration, the tape extends between each margin 21, 22 and around the inside edge 34 only. This V-shaped configuration is used when only one edge is subject to destructive attack.

FIGS. 9 and 10 show the formation of a butt seam wherein a ribbon 49 is fed, preferably extruded, in an I-shape. The margins 21, 22 are fed into the space between the side flanges of the I and the edges 34, 35 approach one another in substantial alignment until they abut the central connecting web of the I. Thereafter, the ribbon is rolled flat into intimate and bonding engagement with the margins 21, 22 such as by rollers 50, 51 (FIG. 10). It is to be understood that the same procedure and substantially the same results would be obtained if the ribbon were extruded in a T-shape, upright or inverted, rather than an I-shape.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

We claim:

1. A method of joining the opposed longitudinal margins of a fibrous sheet to form the longitudinally extending side seam of a tubular container body and simultaneously therewith protecting the raw edge of at least one of said margings comprising, providing a thin, fibrous sheet having raw uncoated longitudinal edges subject to moisture attack, forming said sheet into substantially tubular configuration with the longitudinal margins thereof substantially flat and having a space therebetween to receive a moisture-resistant ribbon of adherent and coherent, flexible material, moving the tube thus formed in a longitudinal direction while feeding said ribbon into the path of travel of said margins and into said space therebetween, bringing said margins into contiguous relation with said ribbon extending therebetween and projecting over the edge of at least one of said margins, and pressing said margins so positioned into intimate engagement with said ribbon to join said margins together and to protectively cover said edge.

2. The method set forth in claim 1 wherein said ribbon is preformed and solid and is fed from a spool.

3. A method of bonding the opposed longitudinal margins of a fibrous sheet to form the longitudinally extending side seam of a tubular container body and simultaneously therewith protecting the raw edge of at least one of said margins comprising, providing a thin, fibrous sheet having raw, uncoated, longitudinal edges subject to moisture attack, forming said sheet into substantially tubular configuration with the longitudinal margins thereof substantially flat and having a space therebetween, moving the tube thus formed in a longitudinal direction, continuously extruding a moisture resistant, coherent, flexible, thermoplastic ribbon in a predetermined shape, feeding said extruded ribbon while in a semi-molten state into the path of travel of said margins and into said space therebetween with the longitudinal axis of said ribbon extending substantially in the same direction as said path of travel, said ribbon being adherent to said margins upon intimate contact therewith, contacting a side of said ribbon with one of said raw edges, bringing said margins into contiguous, predetermined relation while maintaining said contact between said ribbon side and said edge, and pressing said margins so positioned into intimate engagement with said ribbon to bond said margins together and to protectively cover said edge.

4. The method set forth in claim 3 wherein said margins are brought into overlapping relation.

5. The method set forth in claim 4 wherein said ribbon is extruded in a substantially S shape.

6. The method set forth in claim 4 wherein said ribbon is extruded in a substantially V shape.

7. The method set forth in claim 4 wherein said ribbon is extruded in a substantially flat shape.

8. The method set forth in claim 3 wherein said ribbon is extruded in a substantially I shape and the edges of said margins are brought into substantial abutting relation with the central connecting web of said I shaped ribbon disposed therebetween.

References Cited in the file of this patent

UNITED STATES PATENTS

| | | |
|---|---|---|
| 47,532 | Everett | May 2, 1865 |
| 599,248 | Page | Feb. 15, 1898 |
| 638,261 | McCool | Dec. 5, 1899 |
| 684,670 | Boehmler | Oct. 15, 1901 |
| 790,644 | Lloyd | May 23, 1905 |
| 848,978 | Donoghue | Apr. 2, 1907 |
| 2,074,986 | Lagerblade | Mar. 23, 1937 |
| 2,290,184 | Higgins | July 21, 1942 |
| 2,388,297 | Slaughter | Nov. 6, 1945 |
| 2,631,509 | Whytlaw | Mar. 17, 1953 |
| 2,732,882 | Kuts | Jan. 31, 1956 |
| 2,773,773 | Harder et al. | Dec. 11, 1956 |
| 2,801,648 | Anderson et al. | Aug. 6, 1957 |

FOREIGN PATENTS

| | | |
|---|---|---|
| 18,743 | Great Britain | Aug. 30, 1904 |
| 54,939 | Netherlands | Apr. 22, 1941 |